(12) United States Patent
Staroselsky et al.

(10) Patent No.: US 6,767,178 B2
(45) Date of Patent: Jul. 27, 2004

(54) RESPONSE TIME OF A STEAM TURBINE SPEED-CONTROL SYSTEM

(75) Inventors: Naum Staroselsky, West Des Moines, IA (US); Mykhailo Volynskyi, Moscow (RU); Dimitry Drob, West Des Moines, IA (US)

(73) Assignee: Compressor Controls Corporation, Des Moines, IA (US)

( * ) Notice: Subject to any disclaimer, the term of this patent is extended or adjusted under 35 U.S.C. 154(b) by 36 days.

(21) Appl. No.: 10/335,028

(22) Filed: Dec. 31, 2002

(65) Prior Publication Data

US 2004/0126224 A1 Jul. 1, 2004

(51) Int. Cl.[7] .............................................. F01D 17/12
(52) U.S. Cl. ................................ 415/1; 415/17; 415/26
(58) Field of Search ................................. 415/1, 17, 26

(56) References Cited

U.S. PATENT DOCUMENTS 4,177,387 A * 12/1979 Malone ..................... 290/40 R
4,208,591 A * 6/1980 Yannone et al. ........... 290/40 R
4,853,552 A * 8/1989 Kure-Jensen et al. ..... 290/40 C

* cited by examiner

Primary Examiner—Ninh H. Nguyen
(74) Attorney, Agent, or Firm—Sturm & Fix LLP

(57) ABSTRACT

Steam turbine speed-control systems often incorporate pilot valves for controlling the position of hydraulic actuators for steam valves. Operational efficiency of these pilot valves can suffer from imperfections due to manufacturing defects, wear, contaminated oil, and the like, thereby impairing the control system's overall performance. This disclosure relates to a method for improving performance accuracy by incorporating a control system (including additional controllers) dedicated to overcoming the deficiencies of pilot valves or other control system components. With such a system, the lack of adequate control response can be detected by calculating the first time-derivative of a variety of main controlled-parameters. Such parameters can be directly related to steam flow control, such as steam valve position, steam flow rate, and pressure within the steam turbine; or they may be related to the driven equipment: generator power output, flow rate through a compressor, and compressor discharge pressure.

24 Claims, 7 Drawing Sheets

RESPONSE TIME OF A STEAM TURBINE SPEED-CONTROL SYSTEM

TECHNICAL FIELD

This invention relates generally to a method and apparatus for speed control of steam turbines. More specifically, the invention relates to a method for overcoming performance degradation of a worn or defective pilot-valve assembly (a component of the control system) or other control system components, by monitoring the performance of the control system and employing one or more additional, digital controllers; as a result, improving the overall accuracy of the turbine speed-control system.

BACKGROUND ART

To govern the speed and power of a steam turbine, a valve (or more commonly, a set of valves) must be adjusted to vary the flow of steam through the turbine. Typically, such valves are regulated by a hydraulic steam-valve actuator which, in turn, is activated by a pilot valve modulated by an electromechanical actuator that receives its signal from a speed-control system.

Present-day speed control systems for steam turbines include a proportional-integral-differential (PID) controller that utilizes signals representing rotational speed. This speed controller then transmits an actuator-position set point to another PID controller that monitors steam-valve actuator position and whose output activates (indirectly) the steam-valve actuator to render its position equal to the actuator set point. In reality, the steam-valve actuator controller's output is employed as a set point for an electromechanical actuator which modulates a pilot valve: hydraulic fluid is directed through the pilot valve to-and-from the steam-valve actuator to change its position. Pilot valves, steam-valve actuators, and other control system components can, however, suffer performance degradation due to manufacturing defects, wear, contaminated hydraulic fluid, and other ills, thereby impairing system performance. Consequently, a method of control is needed that compensates for these detrimental inefficiencies.

DISCLOSURE OF THE INVENTION

A purpose of this invention is to provide a method for controlling the rate of steam flow through a steam turbine by monitoring the position of a pilot valve along with the dynamics of the controlled system's response, and using this information to compensate for the action of a faulty pilot-valve assembly and/or other control-system components that do not perform to standard.

To accomplish this purpose, control elements are added to the standard control system used to govern turbine speed; in particular, additional PID controllers are included. One of these units is dedicated to maintaining the position of the pilot valve at a set point obtained from a PID main controlled-parameter controller, such as a steam valve position, steam flow, or generator power. Therefore, the controller for pilot-valve position is cascaded with the controller for the main controlled-parameter.

A second controller is dedicated to controlled-system dynamics. Such dynamics can be detected by measuring any of several main controlled-parameters, such as steam-valve actuator position, output of a turbine load (a generator or a compressor), steam flow rate, and turbine pressure. For each of these options, a calculation function is required which takes the first time-derivative of the main controlled-parameter signal. The set point for this second controller is proportional to the difference (error) between the parameter's set point and its actual value.

The resulting signal, inputted to the pilot valve's electro-mechanical actuator, is proportional to a combination of the outputs from the two PID controllers described above. The nature of the combination (linear, for example) is subject to those requirements of the application and customer.

BEST MODE FOR CARRYING OUT THE INVENTION

To maintain accurate, responsive, and stable speed-control of a steam turbine, the control system must be capable of compensating for possible faulty operation of a pilot-valve assembly (or other control system components) by monitoring and regulating both the position of a pilot valve and the time rate-of-change of a main controlled-parameter.

Figure 1:
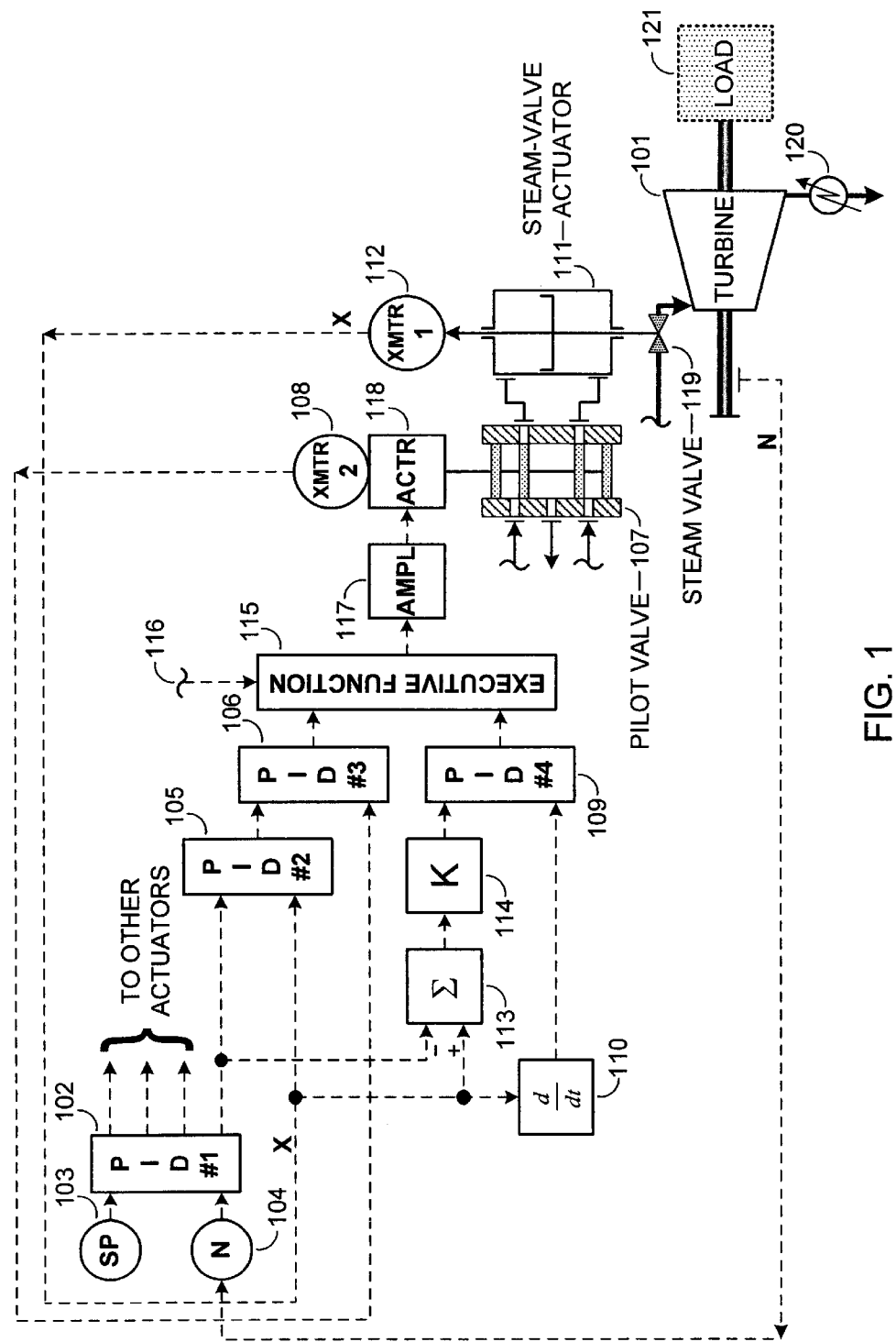
FIG. 1 shows a steam turbine with its speed-control system wherein the main controlled-parameter is a steam-valve position.

FIG. 1 shows a steam turbine 101 complete with its speed-control system incorporating a rotational-speed PID controller (#1) 102 that monitors a speed set point (SP) 103, in addition to comparing and computing rotational-speed measurements obtained by a speed transmitter (N) 104. The output of this #1 controller is a set point for a main controlled-parameter used in a main controlled-parameter position PID controller (#2) 105 which also monitors an actual main controlled-parameter value and causes the main controlled-parameter's value to match the set point.

For the invention to accomplish this task, the output of controller #2 105 is a pilot-valve position set point inputted to an additional PID controller (#3) 106 designed to monitor the current position of a pilot valve 107 [by way of a transmitter (XMTR 2) 108], as well as its set point. The output of controller #3 is directed to reduce to zero the difference between the pilot valve's position and its set point.

Another supplementary PID controller (#4) 109 is intended to govern steam-valve actuator velocity. An input to this controller emanates from a function block (d/dt) 110 which calculates steam-valve velocity from the measured values of the steam-valve actuator's 111 position (X), as reported by its transmitter (XMTR 1) 112. The set point for controller #4 is determined by a summation (Σ) block 113 and by a constant multiplier (K) 114, and it (the velocity set point) is proportional to the error between the steam valve's position and its position set point.

Specifically, the set point is $$\frac{X_{sv} - SP_{sv}}{\Delta t_a}$$

where $X_{sv}$ is the stream valve's instantaneous position; $SP_{sv}$ is the steam valve's set point; and $\Delta t_a$ is the time constant of the actuator ($\Delta t_a = 1/K$). In other embodiments, the set point is $$\frac{X_m - SP_m}{\Delta t_a}$$

where $X_m$ is the main controlled-parameter's instantaneous value; $SP_m$ is the main controlled-parameter's set point; and $\Delta t_a$ is the time constant for the main controlled-parameter.

The signal outputs of controllers #3 106 and #4 109 are then used by an Executive Function 115 whose purpose is to combine these two signals into one output (see FIG. 2) which is accomplished (in one embodiment) by calculating a weighted sum of the two outputs 106, 109. Weightings (or gains) 201, 202 serve to emphasize or de-emphasize the respective contributions of each output to the resulting control action.

Gain #1 201 is acted on by the output from controller #3 106 in a multiplication block 203, while Gain #2 202 is acted on by the output from controller #4 109 in a second multiplication block 204; these two products are then summed 205. Other embodiments for the Executive Function 115 are possible; the main goal is to accomplish a satisfactory combination of the two signals: pilot-valve position 106 and steam-valve actuator velocity 109.

Gains #1 201 and #2 202 can be fixed by an operator or technician, or they could be functions of the magnitude of errors in controllers #3 106 and #4 109. Gains could also be a function of the regime in which the steam turbine is operating, such as start-up or on-line operation.

Examples of possible gains would be Gain #1=0 and Gain #2=1 if the turbine is driving an independent generator; however, if there are generators operating in parallel, Gain #1=1 and Gain #2=0 may be specified.

Figure 2:
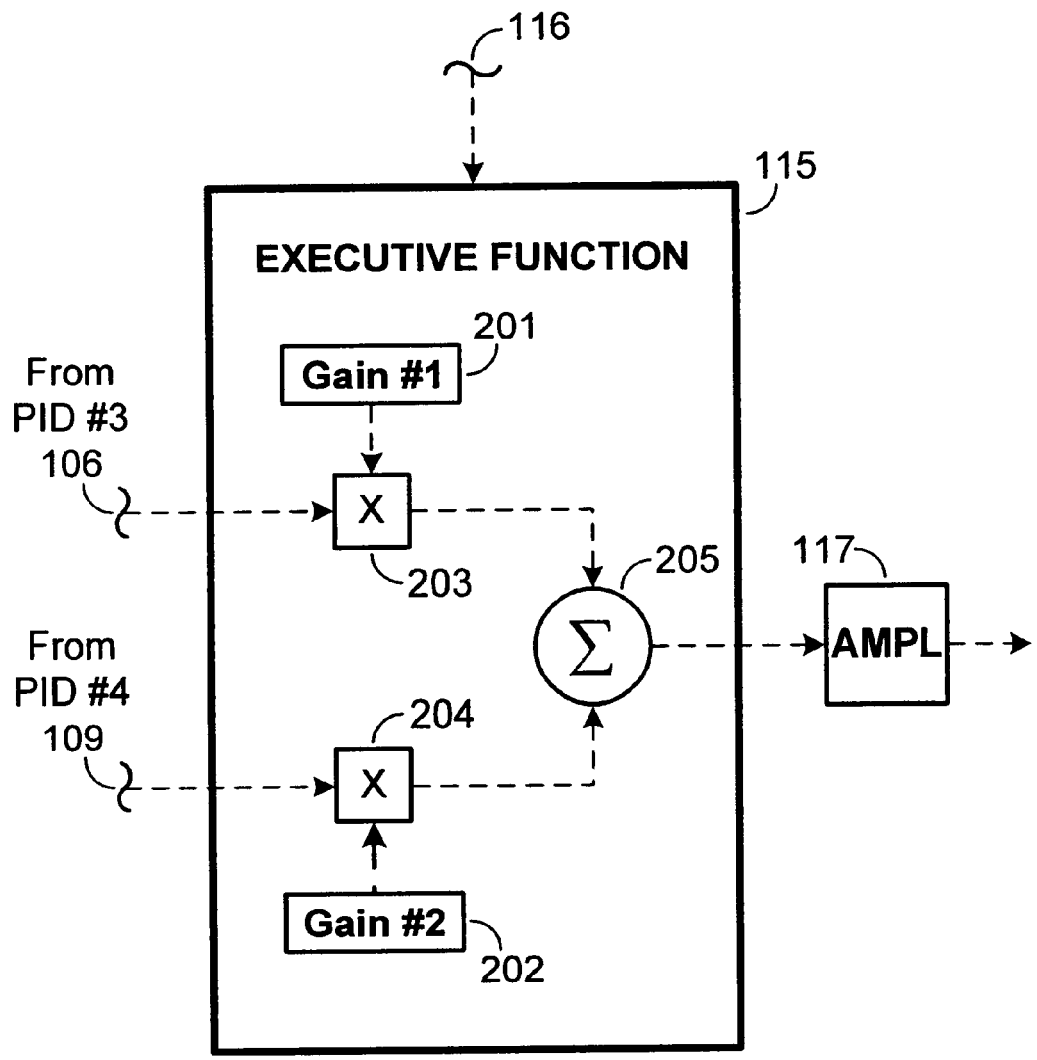
FIG. 2 shows an Executive Function.

An additional signal 116 (utility breaker status) also enters the Executive Function 115, as shown in FIGS. 1 and 2. This signal can be used to modify the linear combination of signals, depending on the status of the utility breaker. For instance, the combination Gain #1=1 and Gain #2=0 may be used if the utility breaker is closed, while Gain #1=0 and Gain #2=1 may be more satisfactory when the utility breaker is open. Other combinations are possible.

The output of the Executive Function 115 enters a signal amplifier (AMPL) 117, and from there it enters an electro-mechanical actuator (ACTR) 118 that modulates the pilot valve 107 which, by way of hydraulic fluid, activates the steam-valve actuator 111 causing a change in its position. The steam-valve actuator is connected to one or more steam valves (represented in FIG. 1 as a single valve 119) used to regulate the flow rate of steam passing through the turbine 101. When steam exits the turbine, it passes into a condenser 120 or other process; the turbine is also used to drive a load 121.

Figure 3:
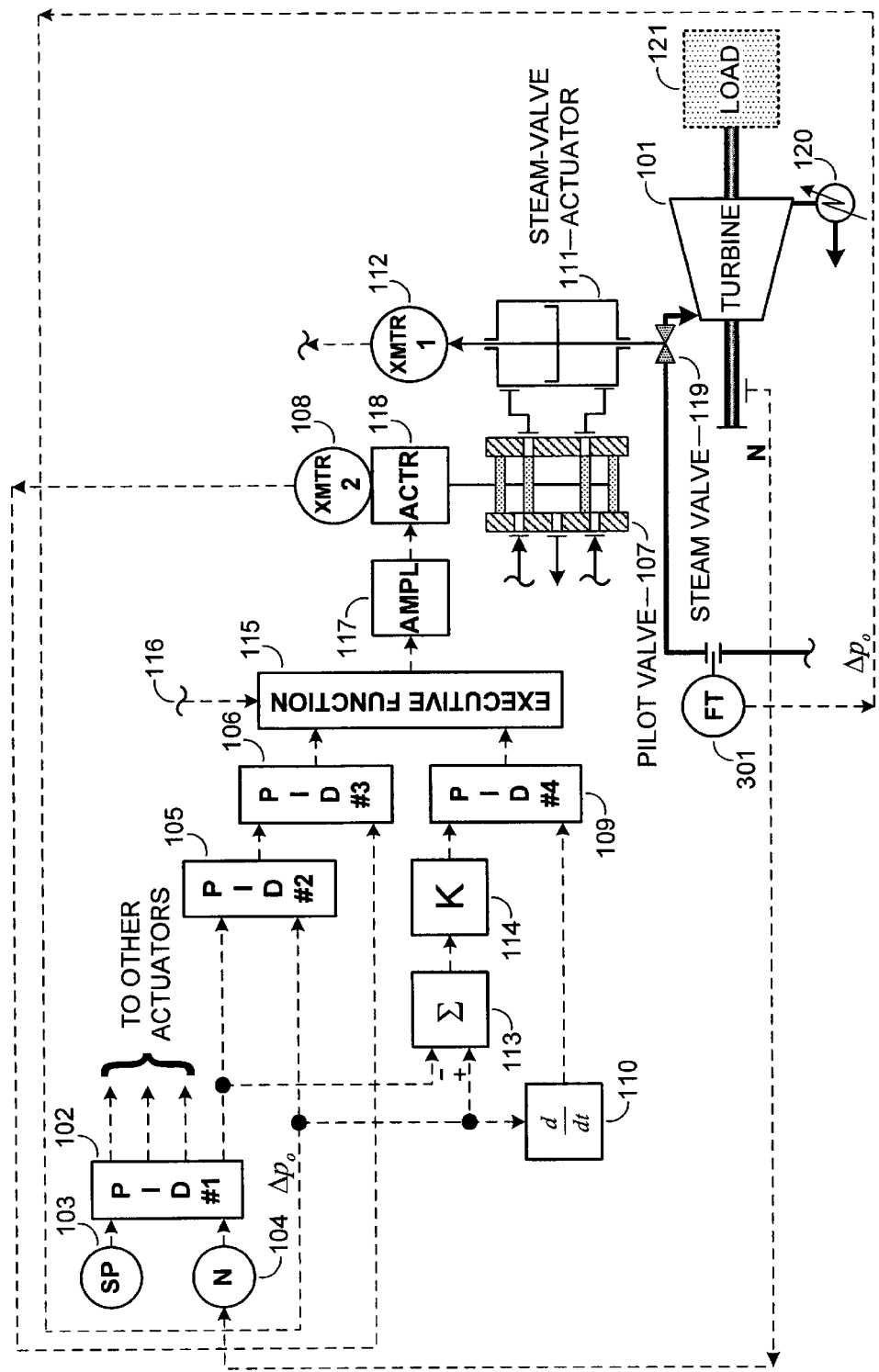
FIG. 3 shows a steam turbine with its speed-control system wherein the main controlled-parameter is a steam flow rate.

In an additional embodiment (FIG. 3), a steam-flow transmitter (FT) 301 signal, $\Delta p_o$, is the main controlled-parameter. This analog value ($\Delta p_o$) replaces the XMTR 1 112 signal (X) as a process variable for controller #2 105, it also inputs to the derivative and summation blocks 110, 113. In this embodiment, the value K 114 would be appropriate for the steam flow-rate response.

Figure 4:
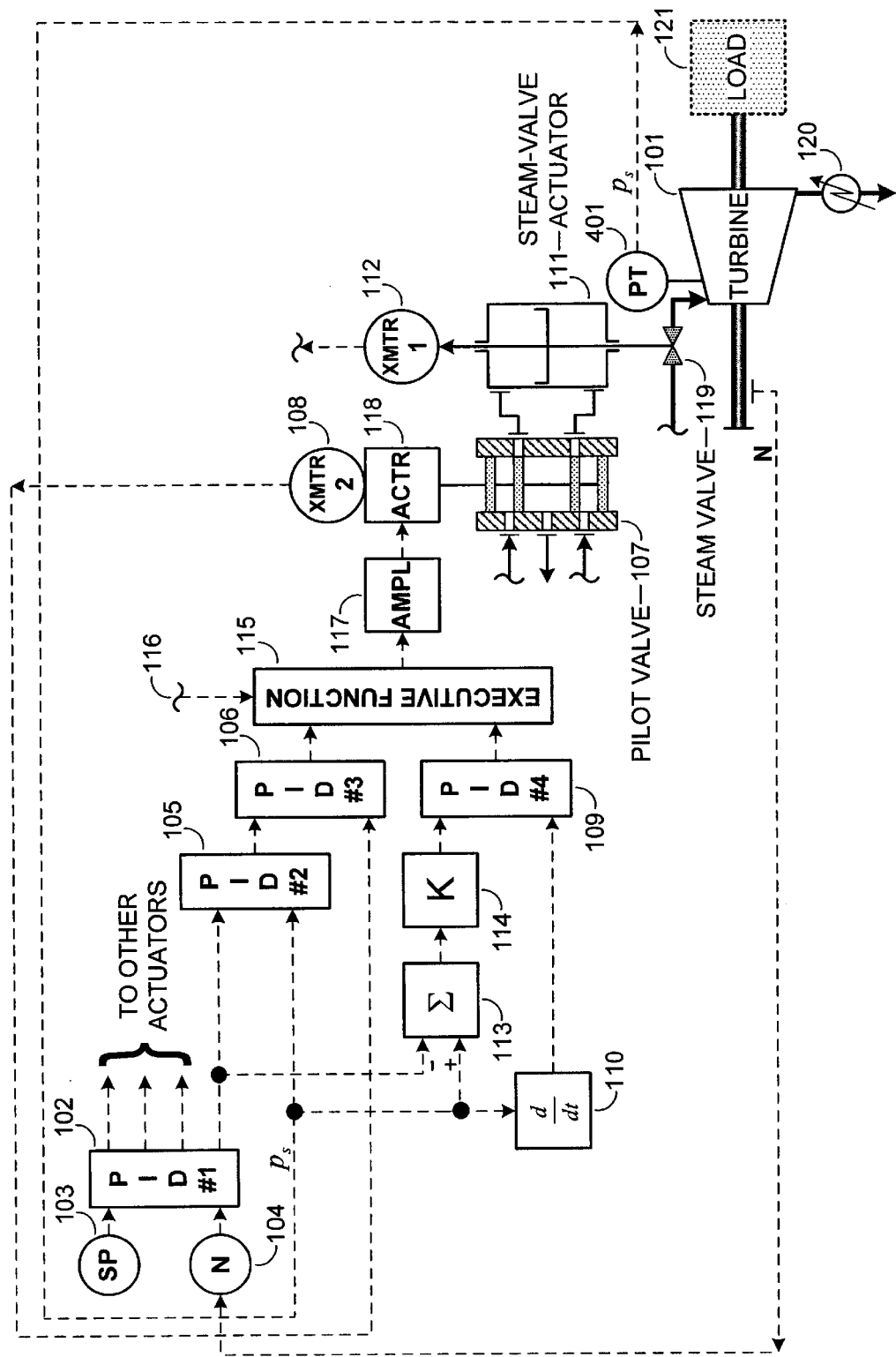
FIG. 4 shows a steam turbine with its speed-control system wherein the main controlled-parameter is a pressure within the steam turbine.

FIG. 4 shows another embodiment where a pressure transmitter (PT) 401 measures a pressure ($p_s$) in the turbine's nozzle box, or in one of the turbine's upstream stages. This analog value ($p_s$) is the main controlled-parameter and replaces the XMTR 1 112 signal (X) as a process variable for controller #2 105, it also inputs to the derivative and summation blocks 110, 113. In this embodiment, the value K 114 would be appropriate for the dynamics of such a pressure.

Figure 5:
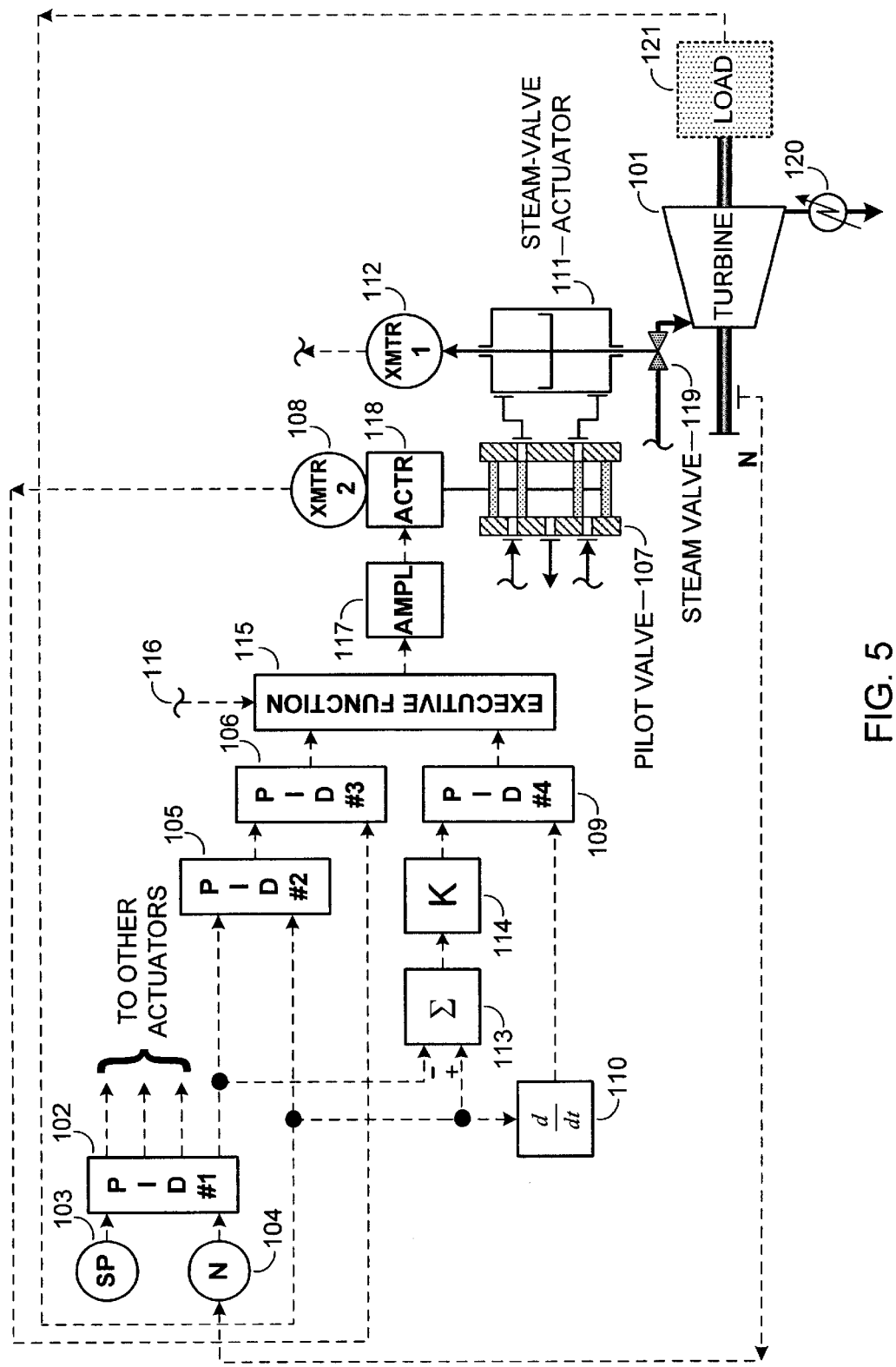
FIG. 5 shows a steam turbine with its speed-control system wherein the main controlled-parameter emanates from the turbine-driven load.
Figure 6:
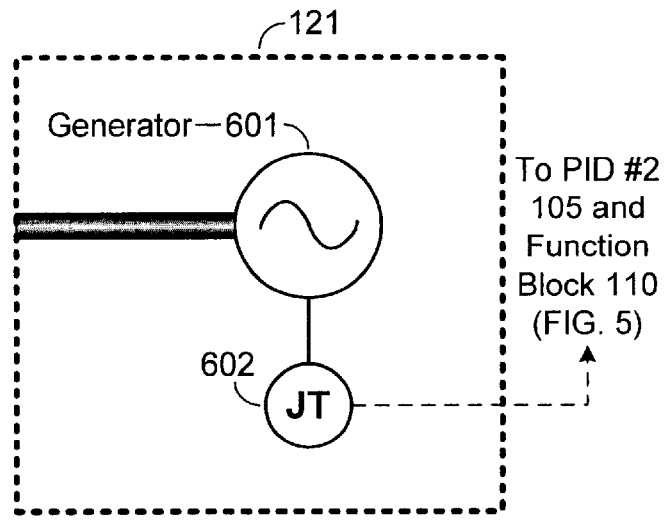
FIG. 6 shows a generator as a turbine-driven load.

In FIG. 5, the signal used as the main controlled-parameter for controller #2 105 (and as inputs to the derivative and summation blocks 110, 113) is shown emanating from the turbine's load 121. Examples of turbine loads and those transmitters required for the present invention are depicted in FIGS. 6 through 9.

In one embodiment (FIG. 6) the load 121 is a generator 601 and the main controlled-parameter is generator power. A power transmitter (JT) 602 provides feedback for PID controller #2 105 (FIG. 5) as its process variable and also for PID controller #4 109, by way of the derivative function block 110, as a velocity process variable.

Figure 7:
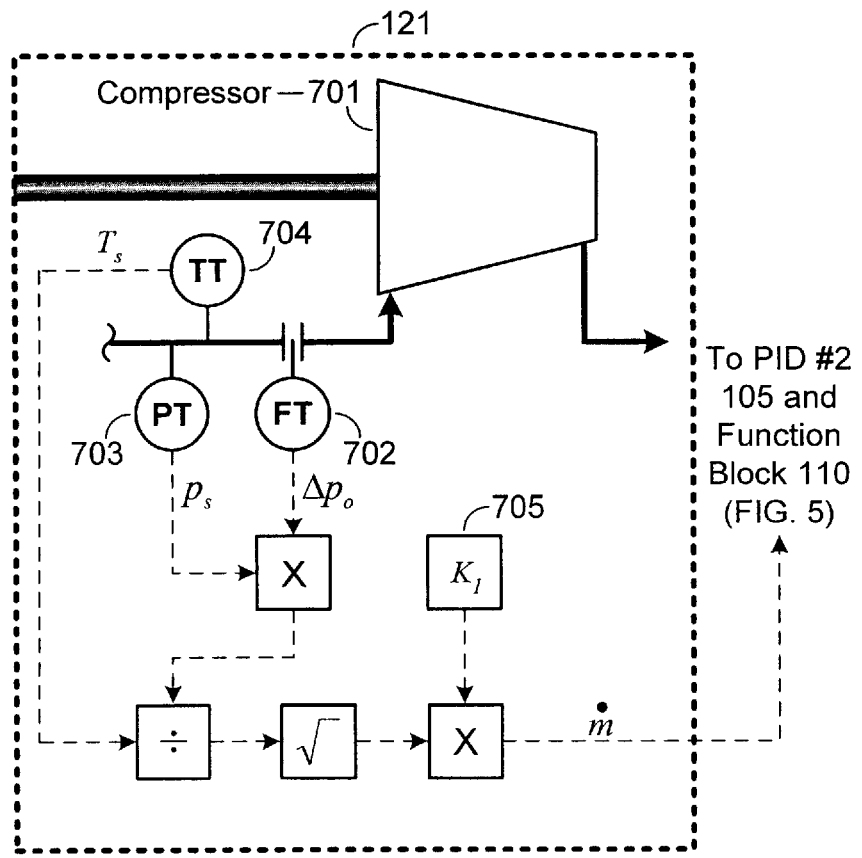
FIG. 7 shows a compressor as a turbine-driven load wherein the main controlled-parameter is a mass flow rate of compressed gas.

FIG. 7 shows an embodiment in which the load 121 is a turbocompressor 701. Here, the mass flow rate through the compressor is calculated as the main controlled-parameter for position controller #2 105 and for velocity controller #4 109 (by way of the derivative function block 110). A flow transmitter (FT) 702 develops a signal ($\Delta p_o$) proportional to the differential pressure realized by a flow measurement device. Suction pressure ($p_s$) is measured by a suction pressure transmitter (PT) 703; and temperature in suction ($T_s$) is reported by a suction temperature transmitter (TT) 704 As shown in FIG. 7, the required calculation is carried out as $$\dot{m} = K_1 \sqrt{\Delta p_o \frac{p_s}{T_s}}$$

where $K_1$ 705 is a function of the gas being compressed and the geometry of the flow measurement device.

Figure 8:
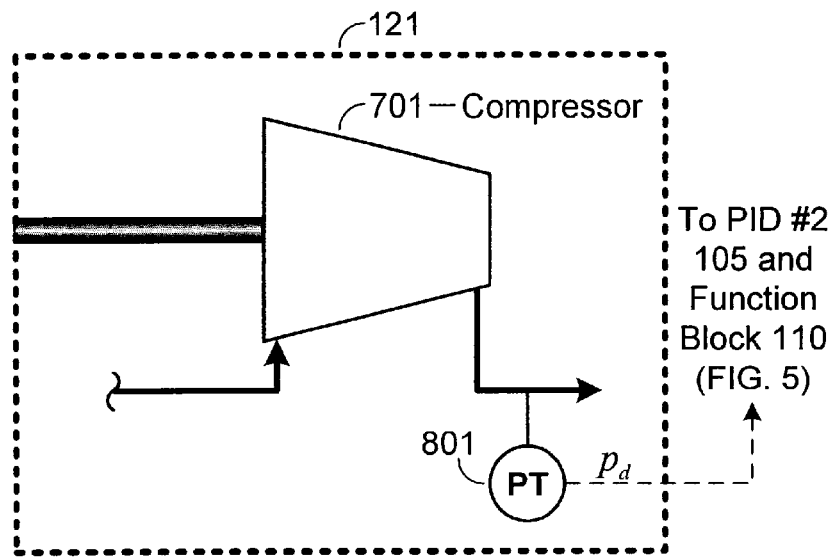
FIG. 8 shows a compressor as a turbine-driven load wherein the main controlled-parameter is a compressor discharge pressure.
Figure 9:
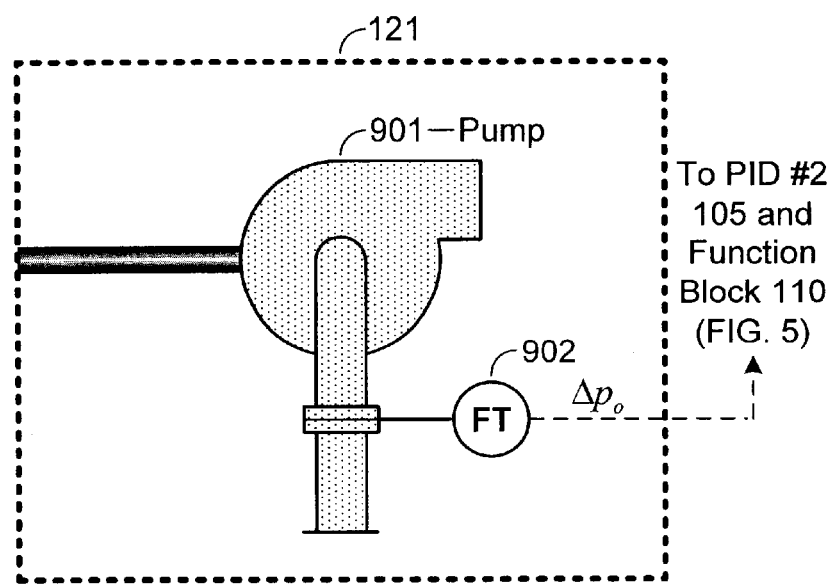
FIG. 9 shows a pump as a turbine-driven load.

A main controlled-parameter for a compressor 701 might also be the compressor's discharge pressure ($P_d$), as shown in FIG. 8. A discharge pressure transmitter (PT) 801 provides the signal for position controller #2 105 and velocity controller #4 109 (by way of a derivative function block 110).

In yet another embodiment (FIG. 9), the load 121 is a pump 901. Here the main controlled-parameter is the flow rate ($\Delta p_o$) of the pumped liquid. A flow transmitter (FT) 902 provides the signal for position controller #2 105 and velocity controller #4 109 (by way of a derivative function block 110).

As evidenced above, a control system's dynamics can be detected in many ways. The present invention is not limited to the several examples described, but may be realized in a variety of ways.

Obviously many modifications and variations of the present invention are possible in light of the above teachings. It is, therefore, to be understood that within the scope of the appended claims, the invention may be practiced otherwise than as specifically described.

We claim:

1. A method for controlling a steam turbine using a control system comprising a first controller for a value of a main controlled-parameter, a second controller for a rate-of-change of the main controlled-parameter, an actuator for manipulating a position of a steam valve or valves, and a pilot valve modulated by a pilot-valve actuator for the purpose of manipulating the steam-valve actuator, the method comprising:

a) receiving a signal proportional to the value of the main controlled-parameter into the first controller;

(b) calculating a first output-signal based on the signal proportional to the value of the main controlled-parameter;

(c) receiving a signal proportional to the rate-of-change of the main controlled-parameter into the second controller;

(d) calculating a second output-signal based on the signal proportional to the value of the main controlled-parameter; and (e) using a combination of the first and second output-signals as a position signal for the pilot-valve actuator.

2. The method of claim 1, wherein the combination of the first and second output-signals is a linear combination.

3. The method of claim 1, wherein the main controlled-parameter is a steam-valve position.

4. The method of claim 1, wherein the main controlled-parameter is a flow rate of steam.

5. The method of claim 1, wherein the main controlled-parameter is a pressure within the steam turbine.

6. The method of claim 1, wherein the steam turbine drives a generator and the main controlled-parameter is a generator power output.

7. The method of claim 1, wherein the steam turbine drives a compressor and the main controlled-parameter is a compressed-gas mass flow rate through the compressor.

8. The method of claim 1, wherein the steam turbine drives a compressor and the main controlled-parameter is a compressor discharge pressure.

9. The method of claim 1, wherein the steam turbine drives a pump and the main controlled-parameter is a flow rate through the pump.

10. The method of claim 1, wherein the first output-signal is based on a difference between the signal proportional to the main controlled-parameter and a main controlled-parameter set point.

11. The method of claim 1, wherein the second output-signal is based on a difference between the signal proportional to the rate-of-change of the main controlled-parameter and a main controlled-parameter, rate-of-change set point.

12. The method of claim 11, wherein the main controlled-parameter, rate-of-change set point is calculated as being proportional to a difference between the signal proportional to the main controlled-parameter and a main controlled-parameter set point.

13. An apparatus for controlling a steam turbine using a control system comprising a first controller for a value of a main controlled-parameter, a second controller for a rate-of-change of the main controlled-parameter, an actuator for manipulating a position of a steam valve or valves, and a pilot valve modulated by a pilot-valve actuator for the purpose of manipulating the steam-valve actuator, the apparatus comprising:

(a) means for receiving a signal proportional to the value of the main controlled-parameter into the first controller;

(b) means for calculating a first output-signal based on the signal proportional to the value of the main controlled-parameter;

(c) means for receiving a signal proportional to the rate-of-change of the main controlled-parameter into the second controller;

(d) means for calculating a second output-signal based on the signal proportional to the value of the main controlled-parameter; and (e) means for using a combination of the first and second output-signals as a position signal for the pilot-valve actuator.

14. The apparatus of claim 13 comprising additional means to calculate a linear combination of the first and second output-signals.

15. The apparatus of claim 13 comprising additional means to use a steam-valve position as the main controlled-parameter.

16. The apparatus of claim 13 comprising additional means to use a flow rate of steam as the main controlled-parameter.

17. The apparatus of claim 13 comprising additional means to use a pressure within the steam turbine as the main controlled-parameter.

18. The apparatus of claim 13, wherein the steam turbine drives a generator and comprises additional means to use a generator power output as the main controlled-parameter.

19. The apparatus of claim 13, wherein the steam turbine drives a compressor and comprises additional means to use a compressed-gas mass flow rate through the compressor as the main controlled-parameter.

20. The apparatus of claim 13, wherein the steam turbine drives a compressor and comprises additional means to use a compressor discharge pressure as the main controlled-parameter.

21. The apparatus of claim 13, wherein the steam turbine drives a pump and comprises additional means to use a flow rate through the pump as the main controlled-parameter.

22. The apparatus of claim 13 including additional means to calculate the first output-signal based on a difference between the signal proportional to the main controlled-parameter and a main controlled-parameter set point.

23. The apparatus of claim 13 including additional means to calculate the second output-signal based on a difference between the signal proportional to the rate-of-change of the main controlled-parameter and a main controlled-parameter, rate-of- change set point.

24. The apparatus of claim 23 including additional means to calculate the main controlled-parameter, rate-of-change set point as being proportional to a difference between the signal proportional to the main controlled-parameter and a main controlled-parameter set point.

* * * * *